Patented May 16, 1939

2,158,775

UNITED STATES PATENT OFFICE 2,158,775

CAKE BATTER AND SHORTENING FOR MAKING CAKE

Benjamin R. Harris, Chicago, Ill., assignor to The Procter & Gamble Company, Cincinnati, Ohio, a corporation of Ohio No Drawing. Application December 16, 1935, Serial No. 54,785

6 Claims. (Cl. 99—92)

My invention relates to improved flour products employing relatively large proportion of sugar. More specifically, my invention relates to cakes and particularly white and yellow layer and pound cakes comprising shortening and improved substances employed therein.

The principal object of my invention is the production of an improved baked flour product. Another object is to produce a better cake.

A further object is the production of an improved flour batter.

A further object is the production of an improved shortening.

A still further object is the provision of improved means for incorporating in cake, and cake batters, an increased proportion of sugar and aqueous materials while still maintaining a cake of good volume and texture which will not suffer from excessive shrinkage when removed from the oven.

All of the objects of my invention relate and have to do with the utilization of a new and improved class of materials whereby the preceding objects are in general attained. Other objects and features of the invention will be apparent from the following description.

By means of my invention, I am able to produce improved baked flour compositions comprising fatty material with substantially higher proportions of sugar and/or liquids such as milk, than have been conventionally used heretofore. In particular, my improved cakes may contain proportions of sugar and/or liquids higher than the proportion of flour. In prior conventional cake formulae, the employment of such proportion of sugar and/or liquids results in excessive shrinkage of the cake after it is removed from the oven and is accompanied by other highly objectionable features in the characteristics of the cake. I have succeeded in employing these higher proportions of sugar and/or liquids, not only without the disadvantages ordinarily encountered but rather with increased beneficial characteristics as to volume, texture, taste, color and keeping qualities of the cakes. These improvements result from the employment of a class of improving agents described herein below, by means of which as much as fifty percent more sugar and/or liquids than flour, or even somewhat more than fifty percent may be employed with good results.

Before describing the manner in which the substances of my present invention are employed in the preparation of a cake batter, I shall disclose to those skilled in the art the character of substances which I employ in accordance with my present invention and methods of producing such substances.

The improved substances used in accordance with my present invention are derivatives of fats or fatty substances, preferably triglycerides. The fats or fatty substances, preferably those having double bonds in the fatty acid radical, as will be explained, are treated with sulphuric acid or its equivalent so as to introduce a sulphate group which imparts to the fatty molecule as a whole definite hydrophillic properties. It appears that the derivatives employed should have a structure which will permit definite orientation of the molecules at a water-oil interface and must include at least one definitely lipophillic radical, that is a radical having an affinity for oil and a hydrophyllic radical having affinity for aqueous media so positioned with respect to each other as to permit definite orientation. In other words, the lipophillic radical and the hydrophillic sulphate radical must be generally or substantially in a state of balance as described in my prior Patent No. 1,917,256 although it is not absolutely essential that the state of balance be sufficient so that the substance has marked power to reduce spattering of margarine.

This feature of the products which I employ may be described somewhat more in detail by citing illustrative formulae. In the formula for triolein given herebelow, it will be noted that a sulphuric acid radical has been introduced at the double bonds of each oleic acid radical:

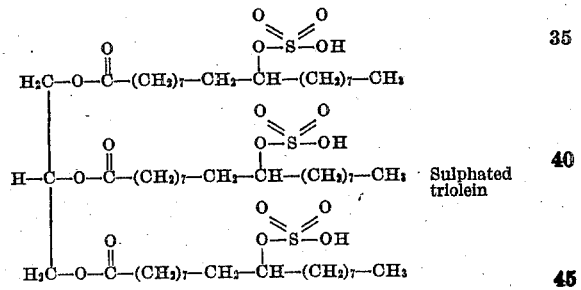

Sulphated triolein

The product illustrated is sulphated triolein and occurs in one of the ordinary Turkey red oils of commerce. This product is not suitable for use in accordance with my invention and a study of the structural formula will at once show that definite orientation at a water-oil interface is not likely to occur with such a substance in the same sense as a substance having at least one dominant lipophile group which, by reason of its affinity for oil, will tend to facilitate and promote the type of orientation required in a balanced molecule.

In contrast with the sulphated triolein, the following compound may be considered:

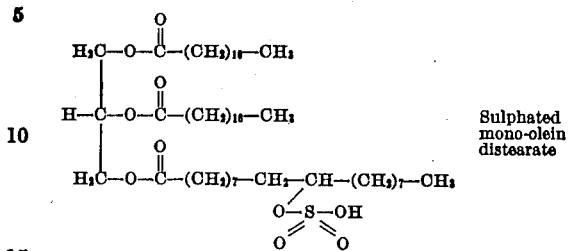
Sulphated mono-olein distearate

In the case of the sulphated mono-olein distearate given immediately hereinabove, the two stearic acid radicals, under the conditions of sulphation employed, remain substantially unaffected while the oleic acid radical, because of the presence of the double bonds, reacts readily with sulphuric acid to produce the sulphate or sulphuric acid ester as shown structurally. Here we have a molecule with lipophile and hydrophile groups in such a state of balance that orientation at a water-oil interface readily occurs, the lipophile radicals being attracted to the oily constituent, and the hydrophile sulphate group attracted to the aqueous constituent at the water-oil interface. In the formula given, the oleic acid radical is shown in the alpha position. Those skilled in the art will understand that substantially the same effect is obtained if the oleic acid radical should be in the beta position. The sulphated mono-olein distearate will function as an antispattering substance in margarine, and this further shows the balanced condition of the molecule as a whole.

It will help those skilled in the art better to understand my invention and the hypothesis by which I explain it after I draw a typical contrast between a common fatty substance of commerce which, when sulphated does yield an improving agent suitable for the purpose of making the improved cake which I disclose hereinbelow, and a common fatty substance of commerce which, when treated with sulphuric acid, does not yield a material which may be employed in my present invention. It is to be understood that this comparison is in a sense an enlargement of the comparison given hereinabove but it will enable those skilled in the art to analyze the invention in terms of naturally occurirng materials which contain mixtures of triglycerides.

The two naturally occurring substances, cocoa butter and olive oil serve amply for comparison purposes. When olive oil is sulphated in the usual commercial manner, a material is obtained which is predominantly hydrophillic—too hydrophillic, when sulphated, not only because it contains too large a proportion of unsaturated fatty acid radicals but also because such unsaturated fatty acid radicals (largely oleic acid) are uniformly and symmetrically distributed. In other words, the location and number of hydrophillic groups present after olive oil is sulphated are such in relation to the lipophile groups coacting with them that there is no segregated orientation of lipophile radicals with respect to the hydrophile radicals. In contrast to olive oil, cocoa butter has a relatively lower iodine value than the iodine value of olive oil and its glycerides consist to a great extent of mono-olein dipalmitate, stearyl palmityl mono-olein, and diolein palmitate. When cocoa butter is sulphated, a material is obtained in which the hydrophile sulphate groups are more adequately balanced by the lipophile groups present, and are located structurally with respect to the lipophile group or groups in a segregated fashion so that the orderly orientation of the molecule as a whole at a water-fat interface is markedly facilitated. Sulphated cocoa butter is effective in the operation of my invention whereas sulphated olive oil and many other so-called sulphated oils of commerce, such as Turkey red oils in general, are not suitable.

In carrying out my invention, the production of the improving agents is somewhat facilitated in general by the use of naturally occurring products, although it is by no means necessary that a naturally occurring fatty substance, such as a naturally occurring triglyceride, be used. When the naturally occurring product is sulphated, as contrasted with a synthetically prepared product, there is naturally a somewhat greater proportion of material present which may not, if used alone, have the property of an improver in accordance with my invention. This is due obviously to the fact that naturally occurring triglycerides are mixtures and while some of them consist predominantly of triglycerides which, when sulphated, produce products suitable for use in my invention, nevertheless, some unsuitable triglycerides may be present which, while they do not impart the improving function desired, nevertheless may be allowed to remain as they have no definitely detrimental effect. For this reason, I prefer to select substances having a large proportion of triglycerides which, when sulphated, will produce suitable improving agents. Examples of materials suitable for my purpose, when sulphated, are cocoa butter, beef tallow, beef stearine, lard, lard stearine, mutton tallow, and partially hydrogenated oils such as cottonseed oil, corn oil, soybean oil, and the like. I may also prepare such substances as mono-olein distearate, mono-olein dipalmitate, stearyl palmityl mono-olein, and mono-olein dilaurate and treat these substances by suitable sulphating procedures to produce final products suitable for use in my invention. In general, the substances which I employ should have a lipophile radical such as at least one fatty acid radical with at least eight carbon atoms but preferably at least twelve carbon atoms and free of hydrophile sulphate groups, and at least one, but preferably not more than two sulphate radicals, the sulphate radical being preferably neutralized, at least in part, to produce a salt such as sodium, potassium, or ammonium salts or salts of other innocuous cations. In the case of a triglyceride, where as many as two sulphuric acid radicals are present, the lipophile radical in general should have more than eight carbon atoms and preferably fourteen or more. When, however, only a single sulphuric acid radical is present, the two lipophile groups present may be of somewhat lower molecular weight and still impart sufficient balance to the molecule as a whole to permit its orderly orientation at a water-oil interface. In this connection, it is to be noted, as stated hereinabove, that the position of the lipophile and hydrophile portions of the molecule is important. In general, the sulphuric acid radical should be at or near the end of the molecule as a whole as in the comparative example given above. Subsequent examples may also be noted in this respect. In consideration of taste in general it is advisable to employ fatty acid radicals having more than 12 (twelve) carbon atoms, rather than 12 or less.

It should not be inferred from the discussion and identification of substances contained hereinabove that the number and type of radicals present in the molecule either before or after sulphation is necessarily greatly limited. A few illustrations will suffice to show that the number and distribution of the sulphuric acid radicals may be modified extensively, and also that the number and character of the lipophile groups may be modified.

In the case of sulphated mono-linolein distearate,

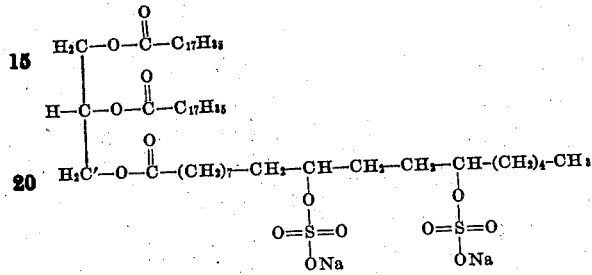

we have two sulphate radicals attached to the same fatty acid radical, and these radicals, hydrophyllic in character, are substantially balanced by the two stearic acid radicals so that the resulting compound is definitely suitable and affords good results in the practice of my present invention. So also in the case where the triglyceride contains a fatty acid radical with a still further degree of unsaturation, such as linolenic acid. Such triglycerides may be sulphated under suitable conditions to attach sulphuric acid at the double bonds and if there is sufficient lipophile mass present in another fatty acid radical or radicals, the product is suitable for use in my invention.

Another example of a substance suitable for use in my invention is represented by the structural formula given below:

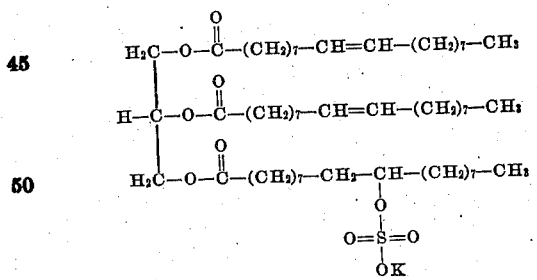

In this case we have a triglyceride with three unsaturated fatty acid radicals, namely triolein, but with only one radical sulphated to form the sulphuric acid ester. It is not to be inferred that in actual practice I produce a substance the individual molecules of which can be represented definitely as above; but by controlling the conditions of reaction an oil or fat having a high iodine value can be employed to produce substances suitable for my invention. So, also, substances having a very low iodine value may be sulphated under somewhat more extreme conditions or for a longer period of time, and suitable substances produced.

My procedure in sulphating is in general similar to the known technical methods for preparing Turkey red oils with certain differences which will be brought out clearly in the illustrative examples listed hereinbelow. The important factors to be considered in the preparation of my materials are the character and degree of unsaturation of the fatty materials selected, the strength and proportion of sulphuric acid and the time of contact of the sulphuric acid and fatty material, the temperature in general being controlled preferably so that it does not rise substantially above 35° C. during sulphation. When I employ partially hydrogenated oils, for example, cottonseed oil, I prefer to select one hydrogenated to an iodine value of between 50 to 70, although oils with higher or lower iodine values may be used as previously suggested.

While all of the improving agents of the class described in my present application are suitable for use therein, it by no means follows that all of them are equally effective under all circumstances. For example, some of the substances employed seem to function better when a so-called "white" cake is produced, while others seem to be more potent when used in a "yellow" cake, that is to say, in a cake which contains a proportion of yolk material. The reason for this effect is not clear. Those skilled in the art, when selecting substances in accordance with my present invention, should be acquainted with this behavior. As stated, however, a substance found to be exceptionally effective in a yellow cake will still be effective in a white cake, although possibly not to the same extent or when used in the same proportions.

While the substance of my invention may be used alone in ordinary cake formulae having a relatively high sugar and liquid content, and exceptionally good results are obtained, I have found that in many cases still further desirable improvements in color, grain and texture may be brought about by introducing with my improving substance a small proportion of free fatty acids such as stearic, myristic, palmitic, oleic acid or equivalent acids or mixtures thereof.

In order further to describe the materials employed in accordance with my invention, I give below a number of examples or methods of producing my improving substances, all of which may be used with good results in producing cakes of the type to which my present invention is directed.

*Example 1*

150 parts of concentrated sulphuric acid (sp. gr. 1.84) are slowly stirred into 145 parts of cottonseed oil previously hydrogenated to an iodine value of approximately 65. The temperature is controlled so that it does not exceed substantially 35° C. and the mixture is allowed to stand at room temperature for two hours; sulphur dioxide is observed to escape during this period.

145 parts of the above mixture are mixed with crushed ice and a solution of 60 parts of sodium hydroxide dissolved in about 400 parts of water and crushed ice are slowly added and stirred in until the ice is melted. The mixture is stirred and heated to about 45° C. until complete dispersion is effected. Sodium chloride is added nearly to saturation, the mixture heated to about 75° C. and the product is allowed to separate out as a supernatant fat layer.

The underlying brine is withdrawn, a similar proportion of water is added, the mixture heated and stirred at 75° C. until the product is well dispersed, and is then salted out once more with sodium chloride. (Separation of the supernatant fat layer is facilitated by the addition of a small proportion of hydrochloric acid, even so small as to be insufficient to acidulate the mixture.)

The brine is again withdrawn and the product dispersed once more in hot water and thrown out with salt. The product thus obtained is a faintly discolored paste with a moisture content of approximately 60%. It may be used as such for direct incorporation in cake batters or for incorporation with egg material, or it may be dehydrated and incorporated in its dry condition with shortening, or the paste may be incorporated directly into the shortening with or without additional moisture to form an emulsion.

Example 2

50 parts of oleostearine and 75 parts of concentrated sulphuric acid are mixed and maintained for one-half hour at a temperature of approximately 30° to 35° C. This mixture is then introduced into iced dilute sodium hydroxide solution and from this point on treated substantially in the manner described in Example 1. The product is a distinctly hydrophillic, substantially white paste, with a moisture content of about 15% and very potent in the production of the improved cakes described hereinabove.

Example 3

145 parts of oleostearine are intimately mixed with 145 parts of concentrated sulphuric acid (sp. gr. 1.84), at a temperature of 32° C. The mixture is allowed to stand for 3 hours at room temperature. The reaction mixture is now mixed with cracked ice and then treated with ice-cold dilute sodium hydroxide solution, in sufficient amount to neutralize all free as well as combined sulphuric acid (methyl orange indicator). The product is successively dispersed in hot water and salted out, as described in Example 1, in a series of four treatments. The product is a markedly hydrophillic paste with a water content of approximately 45%. It may be dehydrated for incorporation with shortening or it may be used in its original form for incorporation in a batter or in eggs to be employed in a cake batter.

Example 4

120 parts of 95% sulphuric acid are caused to react with 100 parts of refined, bleached and deodorized cocoa butter. The temperature is not allowed to rise above 35° C. and the reaction mixture is allowed to stand at room temperature for one and one-half hours. This reaction mixture is then worked up in the manner described in Examples 1 to 3 above, to give a paste of sulphated cocoa butter dispersed in sodium chloride solution.

Beef tallow, mutton tallow, hydrogenated corn oil, hydrogenated soybean oil, lard, mono-olein distearate and like materials may also be treated substantially by the methods described in Examples 1 to 4, above, to give products which are satisfactory for the production of the improved batters described herein.

Example 5

145 parts of cottonseed oil hydrogenated to an iodine value of 8 are treated with 147 parts of concentrated sulphuric acid, the concentrated sulphuric acid being gradually and slowly stirred into the cottonseed oil at a temperature of about 50° C. A water bath is employed to control the temperature of the mixture. After all of the sulphuric acid has been introduced, the mixture is allowed to stand at the temperature of introduction for about one-half hour with occasional stirring until the mixture as a whole becomes homogeneous. It is then allowed to stand over night. The reaction mixture is then hydrated with ice and neutralized with iced sodium hydroxide solution. After neutralization, the reaction mixture is heated to about 75° C. to effect complete dispersion, and the neutralized sulphated material salted out, employing about 15% of salt. A trace of hydrochloric acid preferably is added to produce a good separation. The product is thoroughly washed, preferably three times, and a paste of yellow to cream color, of smooth consistency is obtained having a water content of about 46%. This product may be employed in any of the ways suggested in preceding examples for introduction into the cake batter.

The cottonseed oil employed in the present example, it will be noted, is substantially completely hydrogenated so that there are very few double bonds for the introduction of the sulphuric acid radical. I have found that the product nevertheless can be used with good results. It appears that in some manner, not readily explainable, the sulphuric acid reacts with the substantially saturated triglyceride. It may be that to some extent one of the fatty acid radicals of the triglyceride is substituted by the sulphuric acid radical. Whatever the explanation, it has been found that the product produced is homogeneous, with ample combined sulphuric acid present, and is effective as an improver in accordance with my present invention.

The sulphated products described hereinabove may be used in various proportions in the cake batter. In general, proportions between 2% and about 10%, based upon the shortening content, appear to be the most suitable. The character of the cake mix determines to some extent the proportions used, particularly the moisture and sugar content desired in the cake. It may be stated that in general the use of somewhat more of the substances than actually required will do no harm, although in general I prefer to use no more than is sufficient under the circumstances in which the product is used.

The following examples of cakes employing the materials of my invention are illustrative but by no means exhaustive.

Example 6

| | | |
|---|---|---|
| Cake flour | 567 | |
| Hydrogenated shortening | 266 | A |
| Oleostearine sulphate (15% water, Ex. 2) | 5 | |
| Fine granulated sugar | 624 | |
| Salt | 21 | B |
| Baking powder | 23 | |
| Egg whites | 426 | C |
| Milk powder | 62 | |
| Fine granulated sugar | 170 | D |
| Water | 562 | |
| Vanilla | 4 | |

In the above formula, all ingredients are listed in parts by weight. I incorporate the oleostearine sulphate into the shortening and mix with the flour for five minutes at low speed. The "B" ingredients are then mixed with each other, and the "B" mixture is added to "A" and the two mixed together for two minutes at low speed. The egg whites are then added and mixed for approximately two minutes at low speed. "D" is then prepared by dissolving the solid materials in the water ingredient and half of the resulting mixture is added to the batter. Mixing is continued for one minute and the rest of "D" is added, followed by a final two minute mixing. The batter is slack and very smooth; all ingredients are thoroughly emulsified. The cake is baked at about 360° F. and produces good volume with excellent grain, texture and color.

*Example 7*

| | |
|---|---|
| Cake flour | 567 ⎫ |
| Shortening | 270 ⎬ A |
| Oleostearine sulphate (45% water, Ex. 3) | 19.7 ⎭ |
| Fine granulated sugar | 624 ⎫ |
| Salt | 21 ⎬ B |
| Baking powder | 20 ⎭ |
| Whole eggs | 340   C |
| Milk powder | 60 ⎫ |
| Fine granulated sugar | 170 ⎬ D |
| Water | 540 ⎪ |
| Vanilla | 4 ⎭ |

All ingredients are listed in parts by weight. The oleostearine sulphate is incorporated into the shortening and mixed with the flour for three minutes at low speed. This constitutes the "A" portion of the batter. The "B" ingredients are mixed with each other. The "B" mixture is added to "A" and the whole mixed one minute. The eggs are then added gradually and mixed one minute. The "D" portion is then introduced into the batter in the same manner as the "D" portion in Example 6.

A nice, smooth batter is obtained which, after baking at approximately 370° F., gives a very acceptable cake in all respects, and one that is more moist and characterized by much longer keeping qualities than the conventional yellow layer cake.

*Example 8*

| | |
|---|---|
| Fine granulated sugar | 624 ⎫ |
| Hydrogenated shortening | 266 ⎪ |
| Material prepared in Example 1 (60% moisture) | 26 ⎬ A |
| Salt | 21 ⎭ |
| Whole eggs | 340   B |
| Milk powder | 62 ⎫ |
| Fine granulated sugar | 170 ⎬ C |
| Water | 540 ⎪ |
| Vanilla | 4 ⎭ |
| Cake flour | 567 ⎫ D |
| Baking powder | 20 ⎭ |

All ingredients are listed above in parts by weight. The "A" ingredients are creamed together for three minutes at low speed. "B" is added in three minutes and then mixed an additional three minutes. A solution of the "C" ingredients is prepared, the cake flour and baking powder are sifted together, and "C" and "D" are then added alternately while mixing. A smooth, thoroughly emulsified batter is obtained which bakes out at approximately 360° F. to a yellow layer cake with good volume and grain and very little shrinkage after being removed from the oven.

The above examples of cakes indicate, in a general way, the mode of operation of my invention and the results obtained thereby. The improving agent, such as the oleostearine sulphate or the sulphated hydrogenated cottonseed oil, and the like, may be introduced by incorporating them in the eggs, or in the shortening, or in other ingredients. In all cases, a radically different and far superior cake is secured than is obtainable by the now conventional formulae in which liquids and sugar are considerably lower than in the examples given hereinabove, and in general are less than the proportion of flour used.

In the examples given of cake formulae, I have employed some of the same improving agent shown in the specific examples relating thereto. In general, however, for cake making, any animal fats or partially hydrogenated vegetable oils when suitably sulphated may be used with good results.

The improving agent may be incorporated in the cake by first dispersing it in any of the constituents of the batter, such as the shortening or egg material. Egg material, whether yolks, whites or mixed yolks and whites, is definitely improved for substantially all purposes for which eggs are used by the incorporation of the materials of my present invention. Their emulsifying value is increased, in general they are rendered more homogeneous, and they function better in the food and technical industries in the usual processes employed in such industries.

As seen from the examples relating to the preparation of cake and cake batters, the procedure for mixing the ingredients of the cake batter is very flexible. Indeed it is subject to almost any modification without danger of serious complications in the production of the cake. With some formulae I have found it possible to produce a good cake by merely placing all of the ingredients together into a mixer and then mixing them together to form the batter. The use of my new improving agents makes this procedure possible.

Due to the rugged character of the batter emulsion when employing my substances, mixing methods are much nearer to being fool-proof than heretofore. The batter is much less sensitive to the vagaries of human conduct, and so the importance of the human equation in the mixing operation is greatly minimized.

The improvements in cake making when employing my improved substances are not confined to those cakes wherein the proportion of sugar and/or aqueous material is greater than the amount of flour. In general improvements are obtained, principally in improved color, texture and grain, and in enhancement of keeping qualities. The batter in most cases is prepared much more expeditiously, and is smoother and more uniform.

When employing my improved materials in shortening, any of the usual types of fatty materials may be used, such as lard or other animal fats, partially hydrogenated liquid oils, and so called "compound" shortenings. In any case, an improved shortening is obtained having definite advantage in the preparation of baked flour products.

What I claim as new and desire to protect by Letters Patent is:

1. A cake batter emulsion including flour, sugar, shortening and aqueous material, and having as a constituent thereof a sulphated triglyceride of molecular formula having at least one sulphate group attached to a carbon at a double bond of an unsaturated fatty acid radical and having at least one fatty acid radical without a hydrophyllic susbtituent.

2. An improved dry shortening having, as a constituent thereof, a sulphated triglyceride of molecular formula having at least one sulphate group attached to a carbon at a double bond of an unsaturated fatty acid radical and having at least one fatty acid radical without a hydrophyllic substituent.

3. An improved cake having, as a constituent thereof, a sulphated higher fatty acid triglyceride of molecular formula in which one but not more than one of the fatty acid radicals has a sulphate group resulting from the addition of sulphuric acid at a double bond.

4. The method of producing an improved flour batter emulsion of a class including sugar, flour, shortening, eggs, and aqueous material, which comprises dispersing in the batter a proportion of a sulphated higher fatty acid triglyceride, the molecular formula thereof having at least one fatty acid radical with a sulphate group added at a double bond and having at least one fatty acid radical without a sulphate or equivalent hydrophile group.

5. The cake batter emulsion claimed in claim 1, having a greater proportion of sugar than flour.

6. The cake batter emulsion claimed in claim 1, having a greater proportion of aqueous material than of flour.

BENJAMIN R. HARRIS.